United States Patent [19]
Hyatt et al.

[11] Patent Number: 5,080,406
[45] Date of Patent: Jan. 14, 1992

[54] SWAGABLE FITTING WITH INNER CURVED GROOVES

[75] Inventors: Arthur J. Hyatt, Torrance; Biing-Kwang K. Hseih, Garden Grove, both of Calif.

[73] Assignee: The Deutsch Company, Santa Monica, Calif.

[21] Appl. No.: 496,340

[22] Filed: Mar. 20, 1990

[51] Int. Cl.$^5$ ............................................. F16L 13/00
[52] U.S. Cl. ................................ 285/330; 285/382.2; 285/417; 29/517; 29/520
[58] Field of Search ............ 285/222, 256, 258, 382.2, 285/259, 328, 417, 369; 29/517, 520

[56] References Cited

U.S. PATENT DOCUMENTS

| | | | |
|---|---|---|---|
| 2,341,003 | 2/1944 | Watson | 285/259 X |
| 3,572,779 | 3/1971 | Dawson | 285/382.2 |
| 3,675,949 | 7/1972 | Dawson | 285/354 |
| 3,711,132 | 1/1973 | Nickerson | 285/382.4 |
| 3,848,451 | 11/1974 | Allin | 72/402 |
| 4,289,340 | 9/1981 | Press et al. | 285/422 X |
| 4,305,608 | 12/1981 | Stuemky et al. | 285/256 |
| 4,407,532 | 10/1983 | Patel et al. | 285/256 |
| 4,626,001 | 12/1986 | Lee | 285/94 |

FOREIGN PATENT DOCUMENTS

| | | | |
|---|---|---|---|
| 2430665 | 1/1976 | Fed. Rep. of Germany | 285/256 |
| 0677843 | 8/1952 | United Kingdom | 285/256 |
| 9000697 | 1/1990 | World Int. Prop. O. | 285/382.2 |

Primary Examiner—Dave W. Arola
Assistant Examiner—Tim Aberle
Attorney, Agent, or Firm—Pretty, Schroeder, Brueggemann & Clark

[57] ABSTRACT

A fitting for attachment to a tube by external swaging is disclosed. The fitting includes an outer surface that fits within the dies of a swaging tool, and an inner surface that includes a plurality of axially spaced annular grooves that bite into the tube upon swaging. A reinforcing ring surrounds the outer surface of the fitting in the area of the annular grooves to provide reinforcement. The fitting also has an outer end with a special double tapered configuration such that, after swaging, the tube and inner surface of the fitting in the area of the annular grooves forms a wedge that equally distributes the load and increases the tube retention capability of the fitting. The fitting also includes a tapered shoulder for positioning the fitting within the dies of the swaging tool in a reliable and repeatable manner, and further includes tapered axial grooves on the inner surface of the fitting for preventing torsional movement between the fitting and the tube after swaging. The fitting and the tube also have a balanced configuration which minimizes fretting.

11 Claims, 3 Drawing Sheets

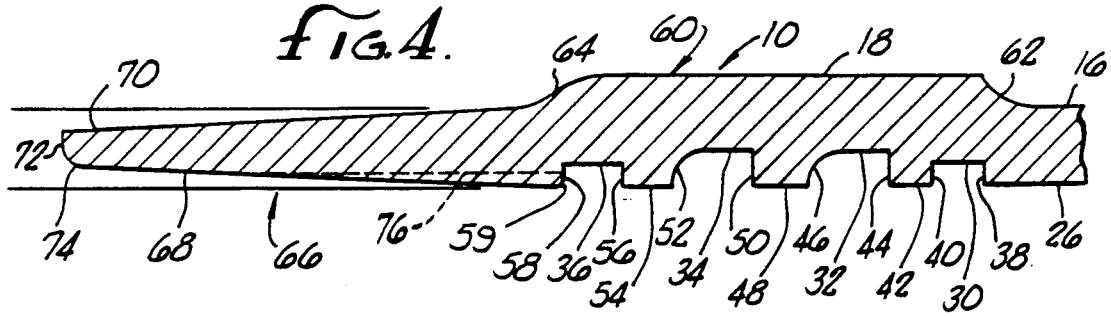
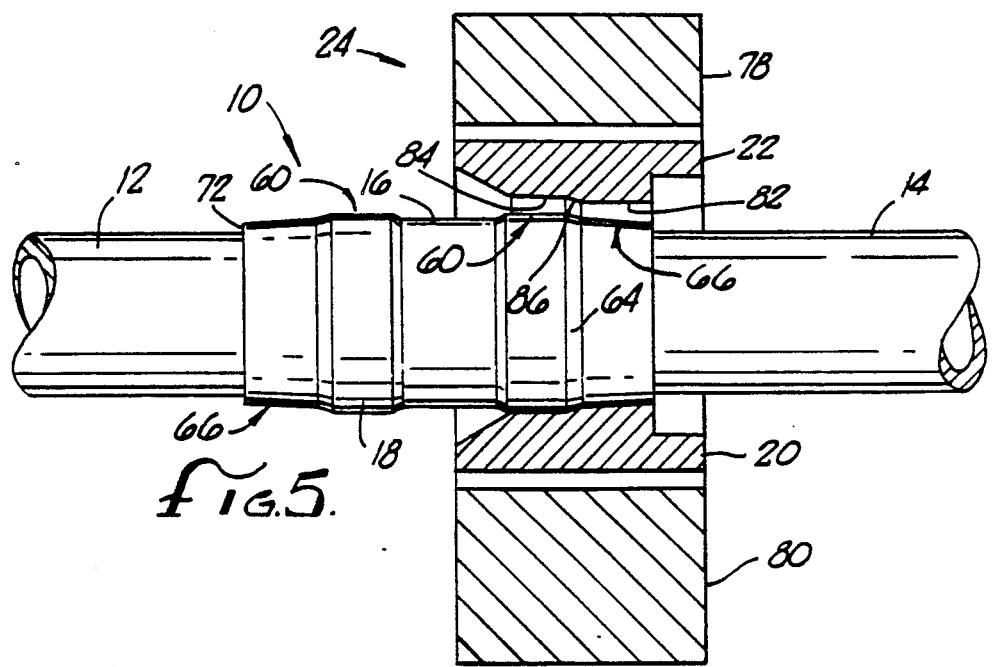
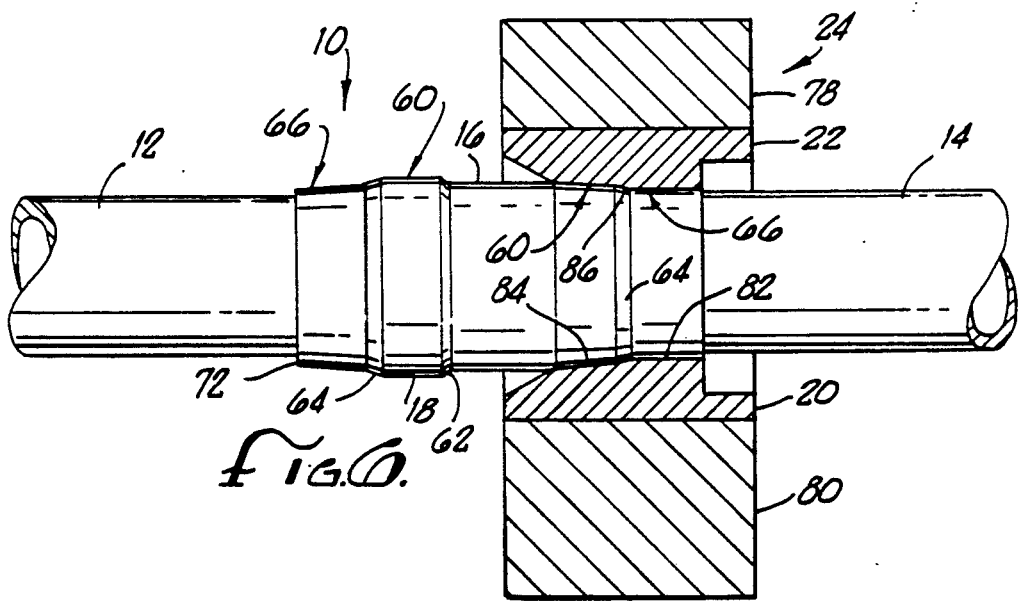

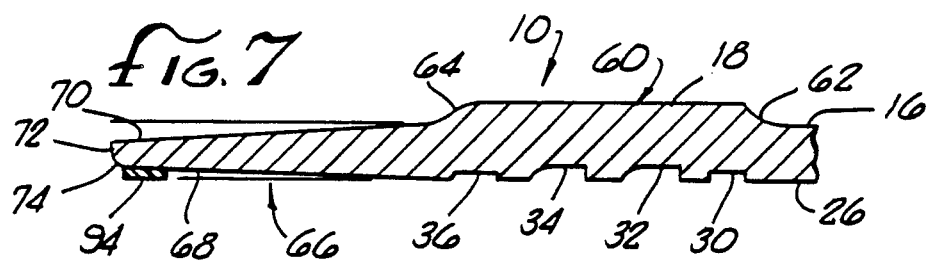
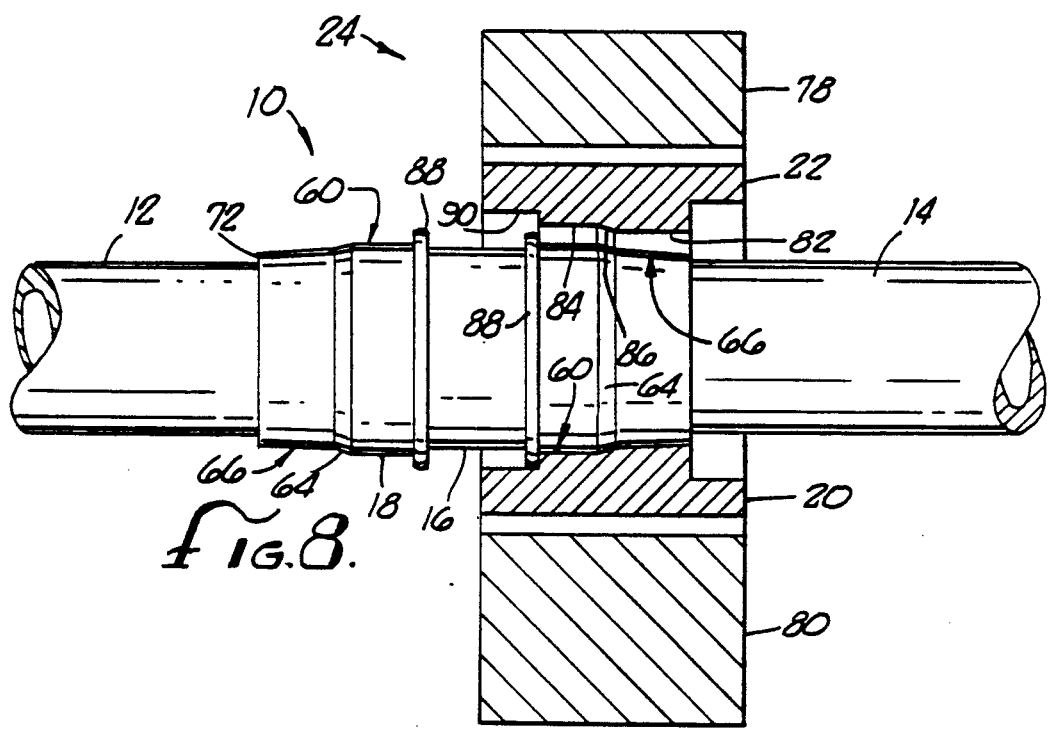
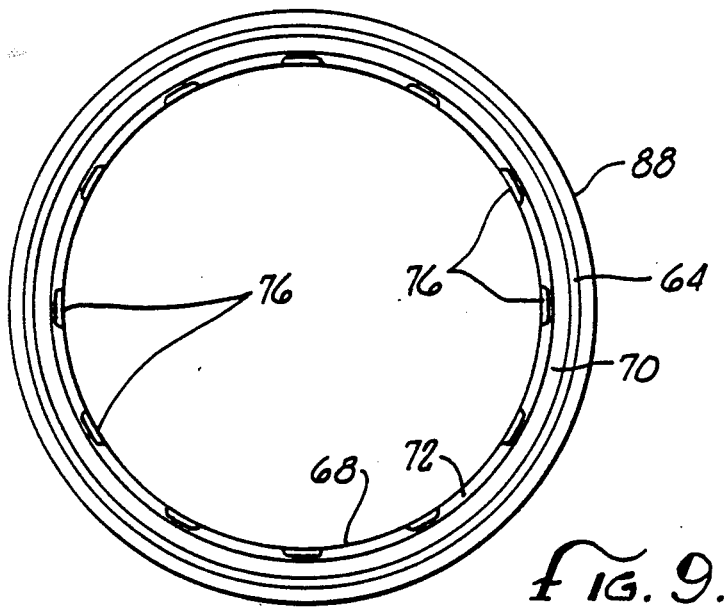

5,080,406

SWAGABLE FITTING WITH INNER CURVED GROOVES

BACKGROUND OF THE INVENTION

The present invention relates to fluid fittings and, more particularly, to a fitting adapted to be connected to a tube by swaging.

Fittings are commonly used to connect metal tubes to each other for use in a variety of applications, such as in the aerospace industry to convey fuel, hydraulic control fluids and the like in an aircraft or space vehicle. In these applications, it is critical that there be a secure connection between the fitting and the tubes in order to withstand vibration and other adverse conditions without failure. In most instances of failure, the tube cracks and ruptures either within the fitting or at the point where the tube enters the fitting. In other instances, the fitting itself will fail.

Various fittings have been developed in the past to connect tubes to each other. In one type of fitting, which is externally swaged, a curved or irregular configuration is provided on the outer surface of the fitting, with the inner surface of the fitting being relatively smooth and cylindrical. After swaging, the irregular configuration is transferred to the inner surface of the fitting which causes the tube to deflect and conform to the irregular configuration. An example of a fitting of this type is shown in U.S. Pat. No. 3,848,451.

In another type of fitting, which is swaged internally, the inner surface of the fitting has a plurality of axially spaced annular grooves into which the material of the tube is deformed by the swaging tool. The annular grooves in these fittings may have sidewalls that are either perpendicular to or inclined with respect to the longitudinal axis of the fitting. Examples of this type of fitting are disclosed in U.S. Pat. No. 3,711,132 and U.S Pat. No. 4,289,340.

Problems have existed in the past with fittings of the types described above. For example, these fittings tend to develop areas of high stress concentration at the point where the material of the tube is swaged into the grooves or irregular configuration of the fitting. These stress concentrations are major contributors to fitting or tubing fatigue failure under flexure and high operating pressures in the tubing. Another problem with these fittings is their relatively large size and weight. Typically, the tube holding power or tube retention capability of the fitting is determined by the number of annular grooves or the nature of the irregular configuration of the fitting, depending upon which one is used. In either case, the holding power is limited by the development of the undesirable stress concentrations, and to increase the holding power, considerable additional length of the fitting is required. As a result, most fittings in use today are relatively large and heavy. Large fittings pose additional problems, since they usually cannot be used in tight or difficult-to-access areas. Heavy fittings are equally troublesome because they add undesirable weight. This is especially undesirable in aircraft applications where the weight of the aircraft must be as low as possible.

Other problems encountered with known fittings is the development of fretting between the tube and the fitting when subjected to bending or rotary flexure tests. When this fretting, which is caused by microscopic axial movement of the tube with respect to the fitting, becomes too great, the fitting or the tubing, or both, will fail.

Yet another disadvantage of the known fittings is the inability to accurately position the fitting within the dies of the swaging tool in a reliable and repeatable fashion. When the fitting is not properly positioned within the dies, a tolerance stack up may occur and cause variations in the degree of swaging. When the fittings are not swaged in the same and correct position each time, the reliability of the swaged joint suffers.

Accordingly, there has existed a definite need for a swagable fitting that has a higher tube retention capability while at the same time being smaller in size and lighter in weight than the known fittings. There has further existed a need for a fitting that minimizes fretting and that can be accurately positioned within the dies of a swaging tool in a reliable and repeatable fashion. The present invention satisfies these and other needs and provides further related advantages.

SUMMARY OF THE INVENTION

The present invention is embodied in a compact and lightweight fitting that minimizes fretting and has a high tube retention capability. The fitting includes a substantially cylindrical body having an outer surface adapted to fit within the dies of a swaging tool and an inner surface defining an axial bore for receiving the tube. The inner surface of the body further includes a plurality of axially spaced annular grooves that bite into the tube upon swaging, with a reinforcing ring also being provided on the outer surface of the body in the area of the annular grooves to provide enhanced reinforcement for the fitting. These structural features, in combination with a tapered outer end on the body, cause the tube and the inner surface of the body in the area of the annular grooves to be at an angle with respect to the longitudinal axis of the fitting after it has been swaged. This forms a wedge that equally distributes the load and increases the tube retention capability of the fitting.

More particularly, the fitting preferably has four axially spaced annular grooves on the inner surface of the body into which the tube is deformed upon swaging. The inner and outer annular grooves each have sidewalls that are substantially perpendicular to the longitudinal axis of the fitting. Between the inner and outer grooves are two intermediate grooves, each of which has one inner sidewall that is substantially perpendicular to the longitudinal axis of the fitting and an outer sidewall having a curved configuration. These annular grooves, in combination with the wedge formed by the fitting and tube after swaging, substantially increase the tube retention capability of the fitting. This allows the fitting to have a high pressure rating of between 1,000 psi and 8,000 psi, which is extremely high considering the compact size and lightweight nature of the fitting.

The outer end of the fitting also has a unique double tapered configuration, whereby the outer end of the fitting is tapered on both its inner and outer surfaces such that the thickness of the outer end decreases in a direction away from the annular grooves. This structure contributes to the balanced configuration of the fitting, discussed below, and assists in minimizing fretting between the fitting and tube after swaging. The double taper on the outer end of the fitting, after swaging, also reduces the normal contact pressure between the fretting surfaces of the fitting and tube. This reduced pressure minimizes such fretting and also allows the use of a material having a low coefficient of friction, such as teflon, to be inserted between the fretting surfaces to further minimize the adverse effects of fretting.

In one aspect of the invention, the fitting includes positioning means for accurately positioning the fitting within the dies of the swaging tool. The positioning means comprises an annular stop on the outer surface of the body between the reinforcing ring and the tapered outer end, and an annular step on the dies having a configuration that substantially matches the configuration of the stop. Thus, when the fitting is inserted into the dies, the stop on the outer surface of the body is received against the step on one of the dies to thereby accurately position the fitting within the dies. In the preferred embodiment, the stop is in the form of a tapered surface providing a transition between the reinforcing ring and the tapered outer end. Since the positioning means accurately positions the fitting within the dies in a reliable and repeatable fashion, the chances of a tolerance stack up are reduced, as are variations in the degree of swaging. This substantially increases the reliability of the swaged joint. In a alternative embodiment, the positioning means further includes an annular flange that fits within a counterbore in the dies to further assist in properly positioning the fitting within the dies prior to swaging, especially for small-sized fittings.

In another aspect of the invention, the fitting includes torsional resistance means for resisting torsional movement between the fitting and the tube after swaging. The torsional resistance means comprises a plurality of radially spaced axial grooves on the inner surface of the body in the area of the tapered outer end. In the preferred embodiment, these axial grooves are formed by a broach and are tapered with respect to the inner surface of the body such that the grooves increase in depth in a direction from the middle of the outer end of the body toward the annular grooves in the area of the reinforcing ring. After swaging, the axial grooves bite into the tube to positively resist torsional movement.

A significant advantage that results from the structure of the fitting is that, after swaging and when subjected to flexure, the deflection on the tube is substantially the same as the deflection on the body of the fitting. This balanced deflection on the tube and body of the fitting is achieved by balancing out their respective moments of inertia, loadings, moduli of elasticity and restraining conditions. This has the effect of minimizing fretting between the fitting and the tube and, thus, increasing the reliability and durability of the swaged fitting.

Other features and advantages of the present invention will become apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 4 is an enlarged and isolated cross-sectional view of a portion of the fitting illustrating axial spaced annular grooves and other features of the fitting;

FIG. 5 is a cross-sectional view of a pair of dies in a swaging tool, with one end of the fitting and its associated tube in position to be swaged;

FIG. 6 is another cross-sectional view, similar to FIG. 5, showing the fitting and tube being swaged by the dies;

FIG. 7 is an isolated cross-sectional view of a portion of the fitting, similar to FIG. 4, showing the use of a teflon insert;

FIG. 8 is a cross-sectional view of the dies and fitting, similar to FIG. 5, showing another embodiment of the invention; and FIG. 9 is an elevational view of the fitting, taken substantially along the line 9—9 of FIG. 2.

DETAILED DESCRIPTION OF THE PREFERRED EMBODIMENT

Figure 1:
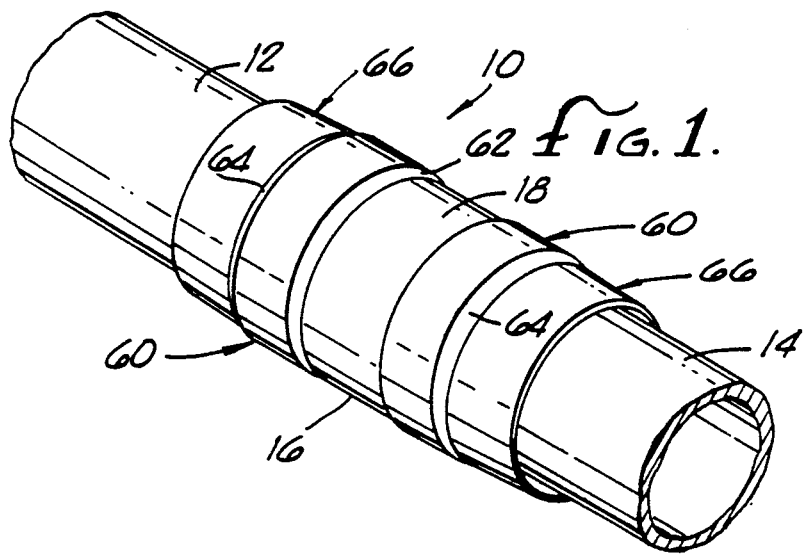
FIG. 1 is perspective view of a fitting embodying the novel features of the invention and shown connecting two tubes to each other.

As shown in the accompanying drawings, the present invention is embodied in a fitting, indicated generally by the referenced numeral 10, for use in connecting two tubes 12 and 14 to each other. The fitting 10 comprises a substantially cylindrical body 16 having an outer surface 18 adapted to fit within the dies 20 and 22 of a swaging tool 24 and an inner surface 26 defining an axial bore for receiving the tubes 12 and 14. The fitting 10 is relatively compact and lightweight and has a higher tube retention capability than bulkier fittings used for the same purpose. The structure of the fitting 10 also advantageously minimizes fretting and allows accurate positioning of the fitting into the dies 20 and 22 of the swaging tool 24 in a reliable and repeatable fashion.

Figure 2:
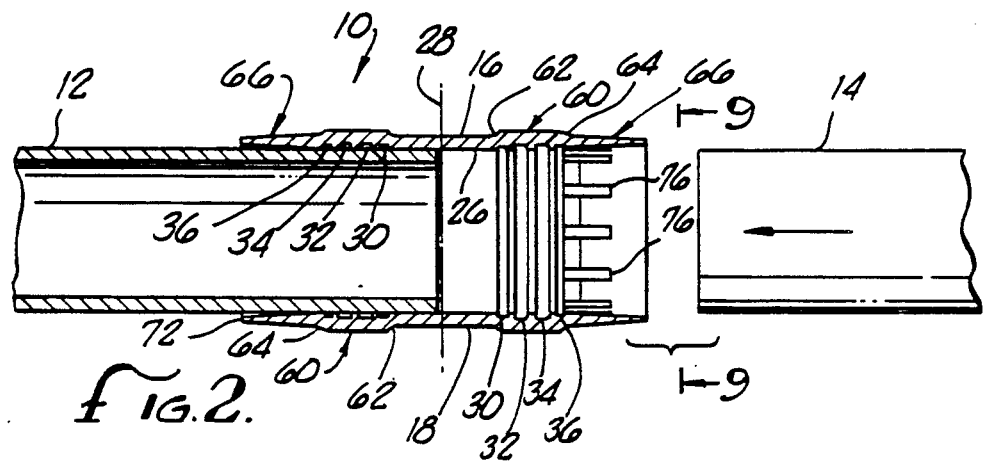
FIG. 2 is a partially exploded, cross-sectional view of the fitting, showing a tube inserted into one end of the fitting and another tube in position for insertion into the other end of the fitting prior to swaging.
Figure 3:
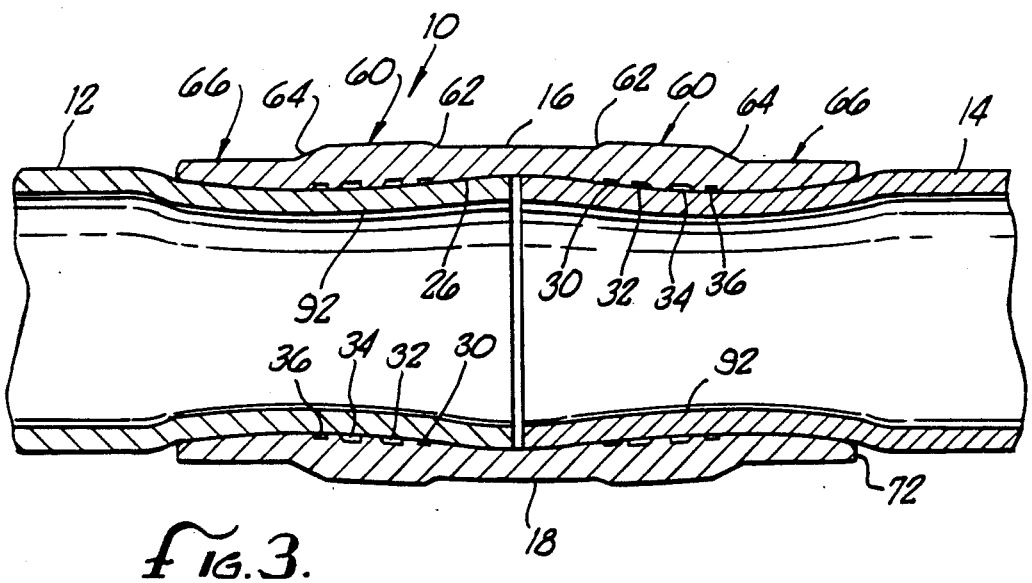
FIG. 3 is an enlarged cross-sectional view of the fitting showing the fitting and tubes after the swaging operation has been completed.

As shown best in FIG. 2, the fitting 10 has a symmetrical configuration on opposite sides of a transverse reference line 28 dividing, for purposes of illustration, the fitting into two separate but identical portions. For ease of reference and clarity, only one of these portions will be described, since it is understood that the other portion of the fitting 10 is structurally and functionally the same. It also should be understood that, depending upon the particular application for the fitting 10, a complete fitting may comprise only one of the two portions. For example, the fitting 10 may comprise an end cap to close off the end of a tube. Alternatively, the fitting 10 may provide some other coupling function, such as a tee, cross fitting, elbow or a reducer, in which case two or more portions of the fitting would be needed to connect multiple tubes For purposes of reference, FIGS. 1 and 2 illustrate the fitting 10 prior to swaging. In FIG. 1, both tubes 12 and 14 are fully inserted into the fitting, and in FIG. 2, one tube 12 is fully inserted into the left end of the fitting and the other tube 14 is shown in position for insertion into the right end of the fitting. FIG. 3 illustrates the fitting 10 after swaging.

As shown best in FIG. 4, the inner surface 26 of the fitting 10 has four axially spaced annular grooves 30, 32, 34 and 36 that are adapted to bite into the tube 12 upon swaging. More particularly, there is a first inner groove 30 having two sidewalls 38 and 40 that are each substantially perpendicular to the inner cylindrical surface 26 of the fitting 10. Since the inner surface 26 of the fitting is cylindrical, the sidewalls 38 and 40 of the first groove 30 can also be said to be substantially perpendicular to the longitudinal axis of the fitting. A second intermediate groove 32 is positioned axially outwardly from the first groove 30 and is physically separated from it by an inner land 42, which is itself a portion of the inner surface 26 of the fitting. The inner sidewall 44 of the second groove 32 is substantially perpendicular to the fitting surface 26 comprising the inner land 42, while the outer sidewall 46 of the second groove 32 has a curved configuration. A third intermediate groove 34 is positioned axially outwardly from the second groove 32 and is physically separated from it by another intermediate land 48, also constituting a portion of the inner surface 26 of the fitting 10. The configuration of the third groove 34 is substantially identical to that of the second groove 32. Thus, the inner sidewall 50 of the third groove 34 is substantially perpendicular to the fitting surface 26 comprising the intermediate land 48, while the outer sidewall 52 has a curved configuration. Finally, a fourth outer groove 36 is positioned axially outwardly from the third groove 34 and is physically separated from it by still another outer land 54 corresponding to the inner surface 26 of the fitting 10. The configuration of the fourth groove 36 is substantially identical to that of the first groove 30. Thus, the two sidewalls 56 and 58 of the fourth groove 36 are each substantially perpendicular to the inner surface 26 of the fitting 10.

All of the perpendicular sidewalls 38, 40, 44, 50 and 56 of the grooves 30, 32, 34 and 36 have sharp corners where they meet with the inner surface 26 of the fitting 10. These sharp corners provide a strong metal-to-metal bite by the fitting 10 into the tube 12 after swaging. The sidewall 58 of the groove 36, however, has a radiused corner 59. This radiused corner 59, and the curved sidewalls 46 and 52 of the grooves 32 and 34, are designed to reduce stress concentrations which could contribute to failure.

The outer surface 18 of the fitting 10 radially opposite the annular grooves 30, 32, 34 and 36 includes a reinforcing ring 60 adapted to reinforce the body 16 of the fitting 10 in the area of the annular grooves. The reinforcing ring 60 extends circumferentially all the way around the fitting 10 and, in the preferred embodiment, covers an axial section of the fitting corresponding to the axial length occupied by the annular grooves 30, 32, 34 and 36. The reinforcing ring 60 adds an additional thickness to the fitting 10 that is about 25 to 35 percent greater than the thickness of the fitting in the location of the transverse reference line 28. This increased annular thickness of the reinforcing ring 60 is sufficient to provide the fitting 10 with an adequate holding force after the swaging operation has been completed.

In one form of the invention, the inner end of the reinforcing ring 60 terminates in a curved surface 62 to provide a relatively smooth transition between the inner end of the reinforcing ring and the outer surface 18 of the fitting. At the outer end of the reinforcing ring 60, there is an annular stop 64 in the form of a tapered surface to provide a smooth transition between the outer end of the reinforcing ring 60 and the outer end 66 of the fitting 10. As described in more detail below, the annular stop 64 on the outer surface 26 of the fitting 10 also assists in accurately positioning the fitting within the dies 20 and 22 of the swaging tool 24.

In accordance with the invention, the outer end 66 of the fitting 10 has a special tapered configuration on both its inner and outer surfaces 68 and 70 such that the thickness of the outer end decreases in a direction away from the annular grooves 30, 32, 34 and 36. More specifically, the outer end 66 extends from the fourth outer groove 36 and the annular stop 64 on the fitting 10, where the outer end is the thickest, outwardly to its free end 72 here it is the thinnest. As shown in FIGS. 2 and 4, because the inner surface 68 of the outer end 66 is tapered, the free end 72 does not contact the tube 12 after it has been inserted into the fitting 10 prior to swaging. Instead, there is a slight gap which is larger at the free end 72, owing to the tapered configuration of the inner surface 68 of the outer end 66.

In the preferred embodiment, the angles of the inner and outer surfaces 68 and 70 of the outer end 66, with respect to the longitudinal axis of the fitting, are approximately 2.5 degrees for the inner surface 68 and 3.5 degrees for the outer surface 70, plus or minus one-half of a degree for each. The inner surface 68 at the free end 72 of the fitting 10 also has a curved configuration in the form of a radiused surface 74. This radiused surface 74 helps prevent stress concentration ordinarily imparted to the tube 12 after swaging, and also helps to reduce stress concentration on the tube while it is being deflected in normal use after swaging. The axial length of the outer end 66 is designed to provide sufficient strain relief and damping to the bending moment of the tube 12 while it is deflected during such use.

To prevent torsional movement between the fitting 10 and the tube 12 during use after swaging, the fitting further includes torsional resistance means. As shown in FIG. 2, the torsional resistance means comprises a plurality of radially spaced axial grooves 76 on the tapered inner surface 68 of the outer end 66. Specifically, the axial grooves 76 extend from the fourth outer annular groove 36 outwardly to about the mid-point of the tapered outer end 66 where they terminate. In the preferred embodiment, these axial grooves 76 are formed using a broach and are tapered with respect to the inner surface 68 of the outer end 66. In one aspect of the invention, the grooves 76 increase in depth in a direction from the outer end 66 of the fitting 10 toward the annular grooves 30, 32, 34 and 36. After swaging, the axial grooves 76 bite into the tube 12 to provide a positive mechanical engagement between the fitting and the tube that resists torsional movement between these two elements.

FIGS. 5 and 6 illustrate one embodiment of the construction of the dies 20 and 22 used in the swaging tool 24 that is of the type that may be used to externally swage the fitting 10 to the tube 12. The swaging tool 24 in the preferred embodiment includes an upper die 20 received within a stationary head 78 of the tool, and a lower die 22 received within a lower die holder 80 adapted to be moved toward the upper die by a piston or other suitable means (not shown). Each of the dies 20 and 22 of the swaging tool 24 has an inner swaging surface 82 of a first diameter adapted to swage the outer end 66 of the fitting 10. This inner swaging surface 82 of the dies 20 and 22 is substantially flat and parallel to the longitudinal axis of the fitting 10. Thus, the outer surface 70 of the tapered outer end 66 of the fitting 10 is at a slight angle with respect to the inner swaging surface 82 of the dies 20 and 22 before swaging. Each of the dies 20 and 22 also has an outer swaging surface 84 of a larger diameter than the inner swaging surface 82. The outer swaging surface 84 of the dies 20 and 22 is adapted to swage the fitting 10 in the area of the reinforcing ring 60 and annular grooves 30, 32, 34 and 36. While the inner swaging surface 82 is substantially flat, the outer swaging surface 84 is slightly tapered with respect to the outer surface 18 of the reinforcing ring 60. As a result, the outer swaging surface 84 will be oriented at an angle with respect to the outer surface 18 of the reinforcing ring 60. Finally, an annular step 86 between the inner and outer swaging surfaces 82 and 84 of the dies 20 and 22 provides a tapered transition between these two surfaces.

The foregoing structure provided by the outer surfaces 18 and 70 of the fitting and the swaging surfaces 82 and 84 of the dies 20 and 22 and, in particular, the annular stop 64 on the fitting 10 and the annular step 86 on the dies 20 and 22, provides a reliable positioning means for accurately positioning the fitting 10 within the swaging tool 24 prior to swaging. Accurate positioning of the fitting 10 within the dies 20 and 22 is accomplished by inserting the swaging tool 24 over the fitting in the usual manner until the swaging surfaces 82 and 84 of the lower die 22 are in contact with the outer surfaces 18 and 70 of the fitting 10, and the annular stop 64 on the fitting is in engagement with the annular step 86 on the lower die When this has occurred, the fitting 10 will have been inserted into the dies 20 and 22 to the proper point. Hence, the positioning means enables accurate positioning of the fitting 10 within the dies 20 and 22 in a reliable and repeatable fashion. This reduces the chances of a tolerance stackup, as well as variations in the degree of swaging. As a result, the reliability of the swaged joint is substantially increased, since the fitting 10 will be swaged in the proper position every time. No guesswork is needed by the operator.

For smaller-sized fittings, an additional positioning means may be provided. As shown in FIG. 8, the outer surface 18 of the fitting 10 at the inner end of the reinforcing ring 60 may be provided with a annular flange 88 adapted to fit within a counterbore 90 on the dies 20 and 22. On small-sized fittings, sometimes the annular stop 64 of the fitting 10 and the annular step 86 of the dies 20 and 22 are quite small and may be difficult to align. Adding the annular flange 88 to the fitting further enhances the proper positioning of the fitting 10 within the dies 20 and 22 and, thus, the reliability of the swaged joint.

During swaging, the swaging surfaces 82 and 84 of the dies 20 and 22 compress the outer surfaces 18 and 70 of the fitting 10 until the fitting and its associated tube 12 is swaged and deflected in the manner shown in FIG. 3. Once the fitting 10 has reached the fully swaged condition of FIG. 3, the axial grooves 76 of the torsional resistance means will deform the tube and bite into it to prevent torsional movement. More importantly, however, after swaging, the tube 12 and the inner surface 26 of the fitting 10 in the area of the annular grooves 30, 32, 34 and 36 will be oriented at an angle with respect to the longitudinal axis of the fitting. This angle, which extends completely around the fitting 10 and the tube 12, forms a frustum or wedge 92 that is adapted to equally distribute the load and increase the tube retention capability of the fitting. In the preferred embodiment this wedge 92 forms an angle with respect to the longitudinal axis of the fitting 10 of approximately 2.5 degrees, plus or minus one-half of a degree. A high degree of holding power also is provided by the annular grooves 30, 32, 34 and 36 which deform the tube 12 and bite into it to create a positive mechanical engagement resisting axial movement between the fitting and the tube. Thus, it is the combination of the annular grooves 30, 32, 34 and 36 and the wedge 92 that provides for the high tube retention capability of the fitting 10.

As noted above, the wedge 92 causes the tube 12 to be constrained equally in the area of the annular grooves 30, 32, 34 and 36. Consequently, in order for the fitting 10 to fail, the external load must reach and then exceed the material yield point of the tube 12 and fitting 10 all along the equally constrained area of the tube. This is in contrast to the fittings of the prior art, in which the fitting usually will fail when the material yield point has been reached on a small stress concentration area of the fitting. It is recalled that these small stress concentrations are developed in the prior art fittings by the square-shaped grooves and/or the waved surface configurations used to create holding power. However, the radiused sidewalls 46 and 52 of the intermediate annular grooves 32 and 34, and the radiused corner 59 of the outer sidewall 36, advantageously reduce shear stress while still providing a sufficient metal-to-metal bite into the tube 12. In tests, it has been found that the inner groove 30 is the primary groove that creates the strongest seal. The other grooves 32, 34 and 36 also contribute to the seal, but to a lesser extent.

The fitting 10 of the present invention is less likely to fail for the further reason that the extra thickness provided by the reinforcing ring 60 makes it more difficult for the fitting to reach the material yield point in this area. The tapered stop 64 on the fitting 10 also helps distribute the load, which further reduces the stress in this area and enhances holding power. Thus, it will be appreciated that the fitting 10 of this invention develops a very high holding power in a very short distance along the axial length of the fitting 10 and tube 12. In the preferred embodiment, the fitting 10 is constructed from cres (stainless steel) and, specifically, PH13-8MO. Working pressure of the fitting 10 has been found to be on the order of 8,000 psi, and at least 1,000 psi. For lower pressure fittings, the fitting may be constructed from aluminum.

Another unique feature of the fitting 10 of this invention is its balanced configuration. It is designed such that fretting is minimized between the tube 12 and fitting 10 when subjected to bending or rotary flexure. That is, by designing the fitting 10 and tube 12 to deflect the same amount, there will be, theoretically, no axial movement between them. This balanced deflection is accomplished by making the deflection on the tube 12 substantially the same as the deflection on the fitting 10. This requires balancing out the moment of inertia of both the tube 12 and the fitting 10 by taking into consideration their corresponding loadings, moduli of elasticity and restraining conditions. The end result after swaging is substantially identical deflection between the tube 12 and the fitting 10 relative to the longitudinal axis of the fitting, resulting in minimal fretting.

Balancing of the deflection of the fitting 10 with the deflection of the tube 12 can be accomplished according to the following equation:

$$\frac{P_F L_F^3}{K_F E_F I_F} = \frac{P_T L_T^3}{K_T E_T I_T}$$

where the subscript F corresponds to the fitting deflection and the subscript T corresponds to the tube deflection, and where:
P = load
L = length
K = constant related to restraining conditions
E = moduli of elasticity I = moment of inertia In the foregoing equation, the variable of length L3 is the same for both the fitting 10 and the tube 12 and, thus, may be cancelled out of the equation. A value for the constant K can be obtained using finite element analysis or from a conventional handbook in the usual manner, recognizing that the load $P_F$ on the fitting is a partially distributed load and the load $P_T$ on the tube is a fully distributed load. A value for the modulus of elasticity E will be determined by the materials selected for the fitting 10 and tube 12, and a value for the moment of inertia I will depend on the cross-sectional configurations and annular thickness of the fitting and tube. With the foregoing information, a balanced deflection on the fitting 10 and tube 12 can be achieved and fretting advantageously minimized.

In one aspect of the invention, fretting between the fitting 10 and tube 12 can be further minimized by inserting a material having a low coefficient of friction between the inner surface 68 of the tapered outer end 66 and the outer surface of the tube 12. As shown in FIG. 7, in one preferred form, the material may comprise a teflon ring 94. The use of other suitable materials in various configuration will also be apparent.

In addition to the advantages discussed above, the fitting 10 of this invention provides further related advantages. For example, the compact and lightweight nature of the fitting 10 allow it to be more easily installed in small, tight places where access is limited and use of a bulkier, heavier, traditional fitting would not be practical. Moreover, even though the fitting 10 is small and lightweight, it may be installed using conventional installation procedures associated with conventional swaging tool operation. It also is noted that the fitting 10 does not utilize external flats to provide torsional resistance or external waves to provide tube retention capability, as in conventional fittings. The elimination of these flats and waves simplifies the manufacturing process and, therefore, is more efficient and economical.

From the foregoing, it will be appreciated that the fitting 10 of this invention provides high tube retention capability and minimizes fretting, while still being relatively compact and lightweight in character. Prior to swaging, the fitting 10 is accurately positioned within the swaging tool 24 by the unique positioning means to provide a reliable swaged joint. After swaging, a wedge 92 is formed by the tube 12 and inner surface 26 of the fitting 10, which, in combination with the annular grooves 30, 32, 34 and 36, provides maximum tube retention capability in the shortest possible axial length.

While a particular form of the invention has been illustrated and described, it will be apparent that various modifications can be made without departing from the spirit and scope of the invention. Accordingly, it is not intended that the invention be limited, except as by the appended claims.

I claim:

1. A fitting for attachment to a tube by swaging, comprising:
   (a) a substantially cylindrical body having an outer end and an inner end, and an outer surface adapted to fit within the dies of a swaging tool and an inner surface defining an axial bore therethrough for receiving the tube; and
   (b) a plurality of axially spaced annular grooves in the inner surface of the body adapted to bite into the tube upon swaging, each defined by an annular bottom surface and inner and outer sidewalls including
   a first inner groove adjacent to the inner end of the body having inner and outer sidewall that are each substantially perpendicular to the longitudinal axis of the fitting.
   a second intermediate groove positioned outwardly from the first groove and a third intermediate groove positioned outwardly from the second groove, each having its inner sidewall substantially perpendicular to the longitudinal axis of the fitting and its outer sidewall having a curved configuration at the juncture with said bottom wall, said curved configuration having a center of radius located radially inwardly of the inner surface of said fitting, and
   a fourth outer groove positioned outwardly from the third groove having inner and outer sidewalls that are each substantially perpendicular to the longitudinal axis of the fitting.

2. The fitting of claim 1, wherein the outer sidewall of the fourth outer groove includes a radiused corner where it meets with the inner surface of the fitting.

3. The fitting of claim 1, further comprising:
   (a) a tapered configuration on the inner surface of the body's outer end such that the annular thickness of the outer end decreases in a direction from the inner end toward the outer end; and
   (b) torsional resistance means for resisting torsional movement between the fitting and the tube after swaging, wherein the torsional resistance means comprises a plurality of radially spaced axial grooves on the inner surface of the outer end that are adapted to bite into the tube upon swaging, and wherein the axial grooves are tapered with respect to the inner surface of the outer end such that the grooves increase in depth in a direction from the outer end toward the inner end.

4. The fitting of claim 1, further comprising means for minimizing fretting between the tube and the fitting after swaging, comprising a tapered outer surface on the outer end of the fitting, such that the annular thickness of the outer end decreases in a direction from the inner end toward the outer end.

5. The fitting of claim 4, further comprising a material having a low coefficient of friction positioned between the tube and the outer end of the body.

6. The fitting of claim 5, wherein the material is TEFLON.

7. A fitting for attachment to a tube by swaging, comprising:
   (a) a substantially cylindrical body having an outer end and an inner end, and outer surface adapted to fit within the dies of a swaging tool and an inner surface defining an axial bore therethrough for receiving the tube;
   (b) means on the body for preventing axial movement of the body with respect to the tube after swaging;
   (c) the outer end on the body having a tapered configuration on its inner surface such that the annular thickness of the outer end decreases in a direction from the inner end toward the outer end;
   (d) torsional resistance means for resisting torsional movement between the fitting and the tube after swaging, wherein the torsional resistance means comprises a plurality of radially spaced axial grooves on the inner surface of the outer end that are adapted to bite into the tube upon swaging, and wherein the axial grooves are tapered with respect to the inner surface of the outer end such that the grooves increase in depth in a direction from the outer end toward the inner end.

8. The fitting of claim 7, further comprising means for minimizing fretting between the tube and the fitting after swaging, comprising a tapered configuration on the outer surface of the outer end such that the annular thickness of the outer end decreases in a direction from the inner end toward the outer end.

9. The fitting of claim 8, wherein the angle between the outer surface of the outer end and the longitudinal axis of the fitting is between 3°–4°.

10. The fitting of claim 8, further comprising a material having a low coefficient of friction positioned between the tube and the outer end of the body.

11. The fitting of claim 10, wherein the material is TEFLON.

* * * * *